July 10, 1956

I. MYER 2,753,781

AUTOMATIC ROW CULTIVATOR

Filed Dec. 24, 1952

Ira Myer
INVENTOR.

BY *Clarence A. O'Brien*
*and Harvey B. Jacobson*
Attorneys

July 10, 1956     I. MYER     2,753,781
AUTOMATIC ROW CULTIVATOR
Filed Dec. 24, 1952     4 Sheets-Sheet 2
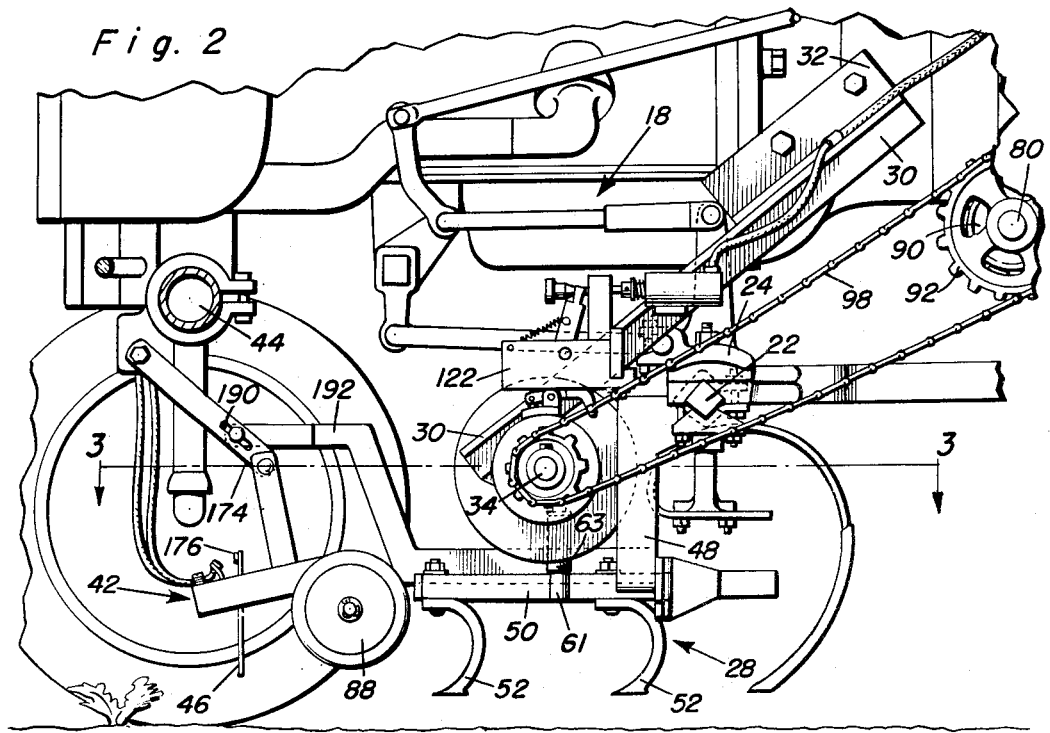
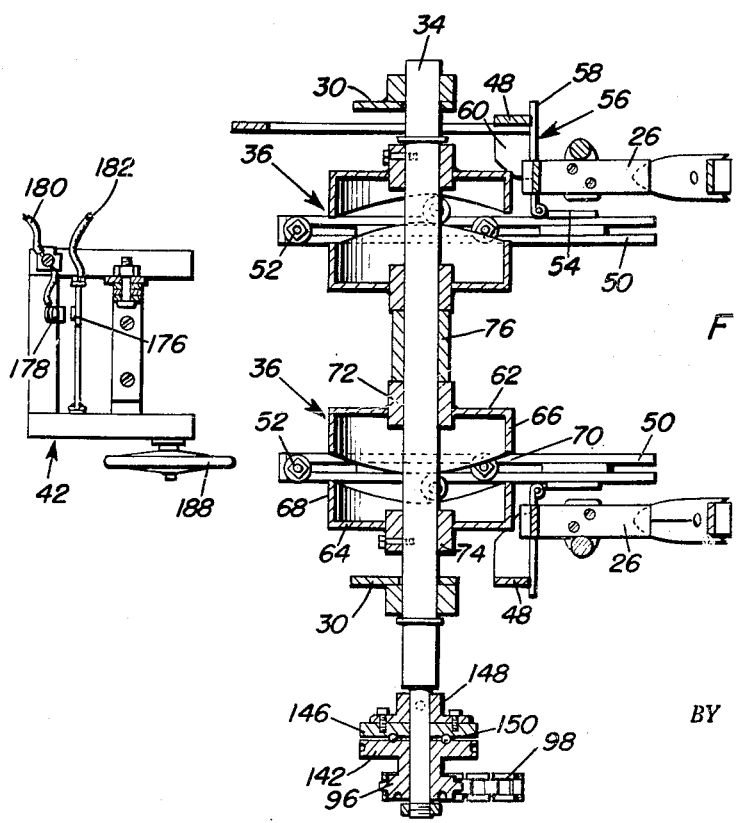
Ira Myer
INVENTOR.

July 10, 1956 I. MYER 2,753,781
AUTOMATIC ROW CULTIVATOR
Filed Dec. 24, 1952 4 Sheets-Sheet 3

Ira Myer
INVENTOR.

July 10, 1956
I. MYER
2,753,781
AUTOMATIC ROW CULTIVATOR
Filed Dec. 24, 1952
4 Sheets-Sheet 4
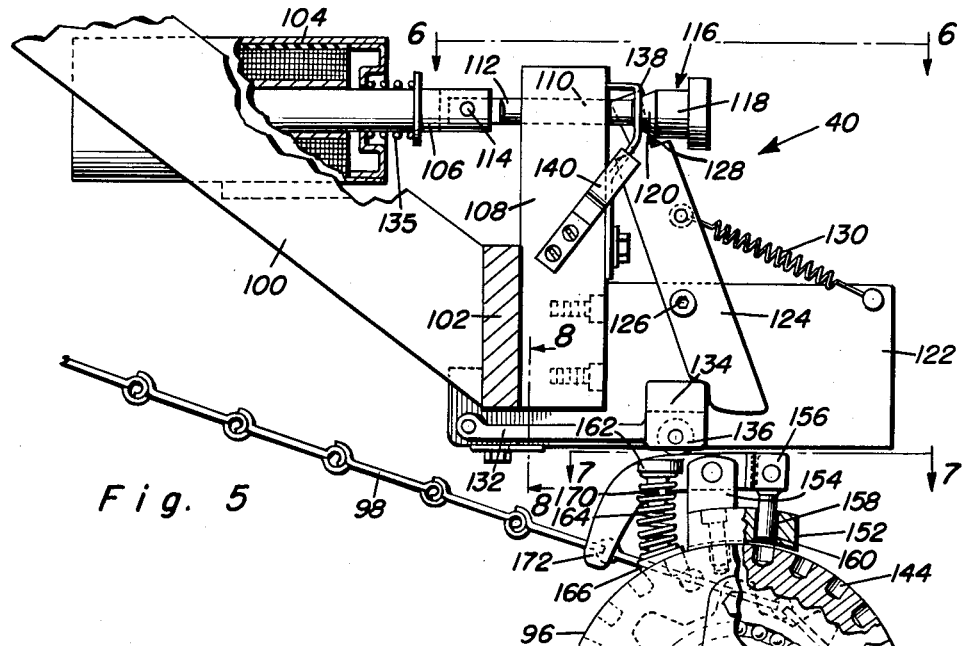
Fig. 5
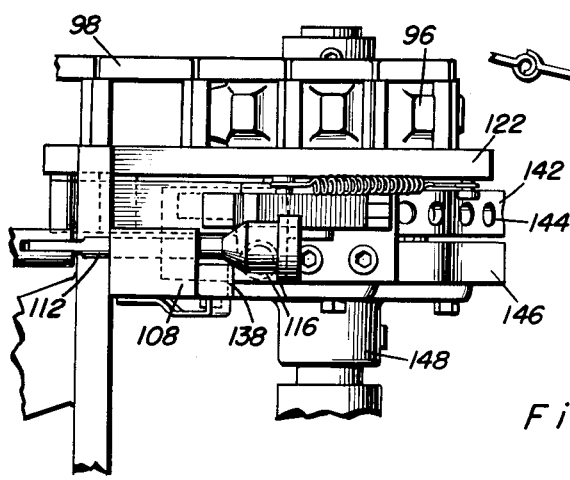
Fig. 6
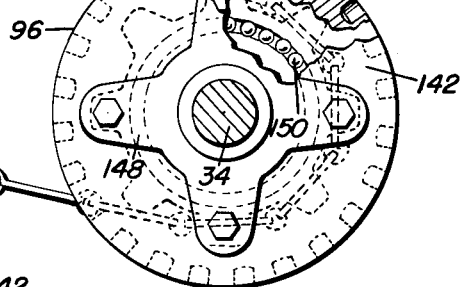
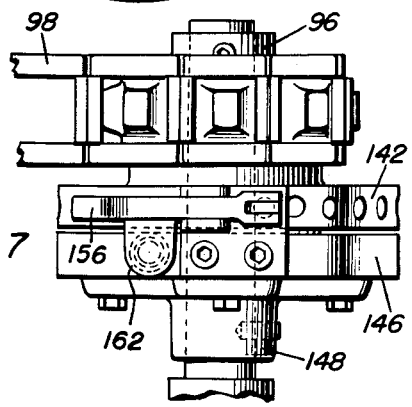
Fig. 7
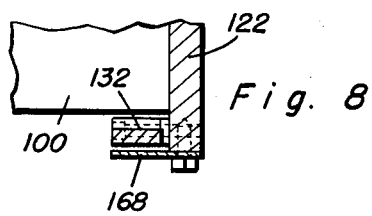
Fig. 8
Ira Myer
INVENTOR.
BY *Thomas A. O'Brien*
and *Harvey B. Jackson*
Attorneys United States Patent Office 2,753,781
Patented July 10, 1956

2,753,781

AUTOMATIC ROW CULTIVATOR

Ira Myer, Ephrata, Pa.

Application December 24, 1952, Serial No. 327,813

13 Claims. (Cl. 97—21)

The present invention relates to farm machinery and is directed to an automatic row cultivating or hoeing device and it constitutes an improvement on my copending application Ser. No. 197,733, filed November 27, 1950, now Patent No. 2,664,802.

It is the primary object of the invention to provide a tractor mounted row cultivating attachment that requires no modification of, but which may be used in conjunction with, a conventional tractor mounted cultivator lift assembly or unit and which may utilize conventional cultivating tool assemblies of the gang cultivator type, while yet providing plant sensitive means for laterally moving the cultivating assembly out of the path of the row to spare selected plants in the row.

Another object of the invention, ancillary to the primary object, is to provide a cultivating assembly comprising horizontally disposed tool bars which are mounted for swinging movement toward and away from one another.

Another extremely important object of the invention is to provide a means for swinging the tool bars toward and away from one another, which means will not interfere with the raising and lowering of the cultivating assembly in response to movement of the lift unit of the tractor.

Still another very important object of the invention is to provide a novel tractor drive means for the cam means wherein the movement of the cam means will be in direct proportion to the movement of the tractor and wherein the movement of the cam means may be varied to selected ratios with such tractor movement.

Yet another object of the invention is to provide an electrically operated clutch means for interconnecting the cam drive means with the cam means which is extremely quick acting, powerful and which requires a minimum of power to operate by virtue of a unique leverage and driving pin arrangement.

A last object of the invention to be mentioned specifically is the provision of a plant actuated electric contact switch which is mounted forwardly on the tractor of the cultivator assembly to energize the clutch upon plant contact, or manual manipulation, whereby the tool bars of the cultivator assembly may be moved out of the path of the plant by interconnection of the cam drive with the cam means.

These, together with various ancillary objects and features which will later become apparent as the following description proceeds, are attained by this invention, a preferred embodiment of which is shown by way of example only in the accompanying drawings wherein:

Figure 2 is an enlarged side elevational view of the forward portion of the tractor more clearly showing the attachment of the hoeing device thereto;

Figure 3 is a sectional view taken substantially along section line 3—3 of Figure 2 disclosing the novel cam means of the attachment for moving the tool bars of the cultivator assembly toward and away from one another;

Figure 5 is an enlarged side elevational view, with parts being shown broken away and partially in section for clarity of detail, of the clutch arrangement for connecting the drive means to the cam means;

Figure 6 is a top view of the clutch assembly of Figure 5 taken substantially along section line 6—6 of that figure;

Figure 7 is a section view taken substantially along section line 7—7 of Figure 5;

Figure 8 is a section view taken substantially along section line 8—8 of Figure 5;

Figure 1:
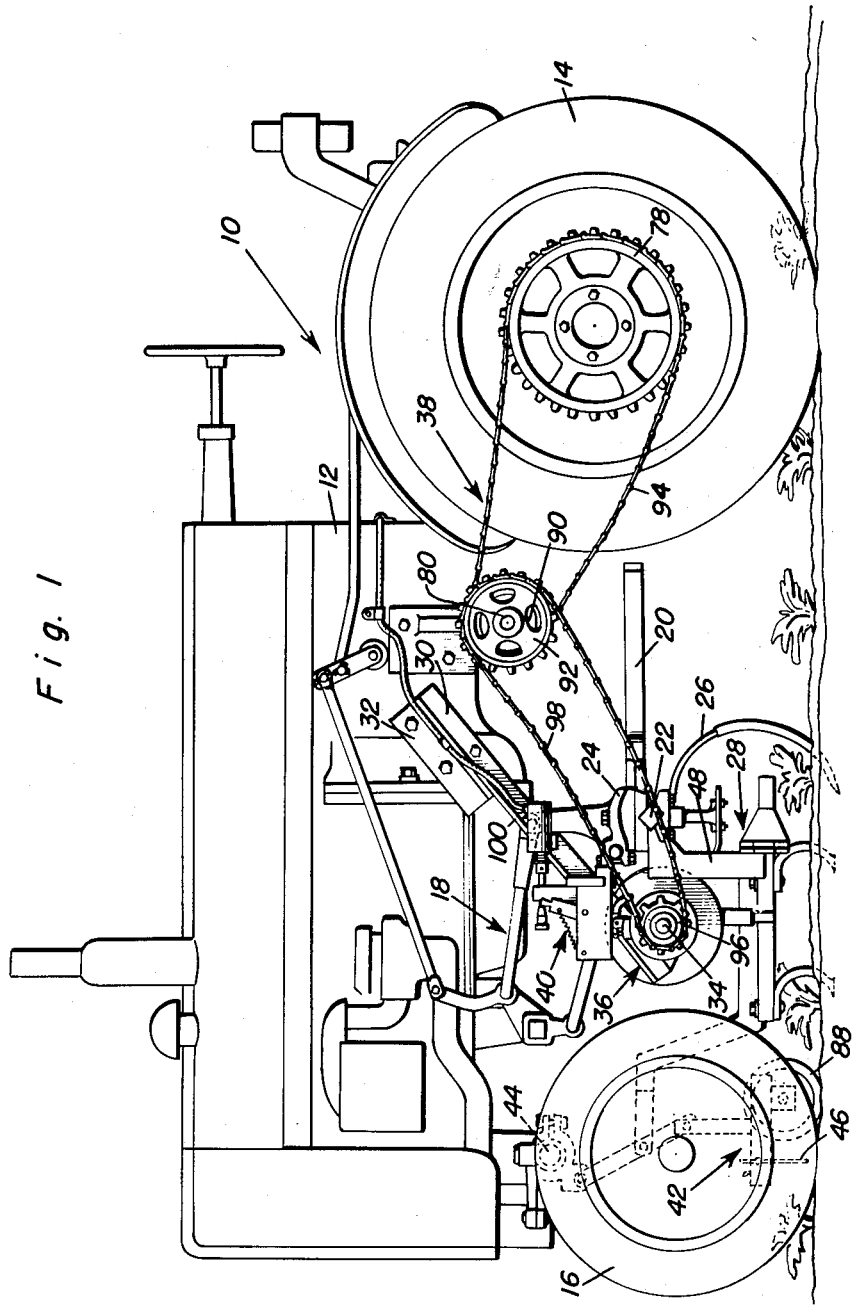
Figure 1 is a side elevational view of the plant sensitive hoeing attachment mounted on a tractor in operative position.

Primarily, the cultivating device of the present invention is to be moved along a row of plants to cultivate between the plants of the row without harming the plants themselves and to thin out the undeveloped plants and weeds in the row while permitting the more sturdy plants to remain unharmed.

Referring now to the accompanying drawings in detail, it will be noted that like reference characters are utilized throughout the various views to designate similar parts.

In Figure 1, wherein the over-all arrangement and mounting of the invention may be most readily observed, there is shown a suitable tractor 10 having a chassis 12, rear driving wheels 14, front wheels 16 and a cultivator lift unit or assembly 18. To show the relative positioning of the device of the present invention with respect thereto, a conventional cultivator frame 20 is shown mounted on the tool mounting stub shafts 22 by means of the tool bar clamps 24 on the lift unit 18. Also provided on the frame 20 is a suitable cultivating shovel 26. It is to be noted that all of the above recited structure is conventional in nature and is illustrative only to set forth the operational environment of the present invention. It is to be understood that other tractors utilizing other lift assemblies could be employed for mounting the device.

Still referring to Figure 1, the components of the hoeing device and their over-all relation to one another and to the pertinent portions of the tractor 10 will now be described. Suspended from the stub shafts 22 at the free ends of the hydraulic lift unit 18 is a cultivator assembly 28. As will be noted, this cultivator assembly 28 is disposed forwardly of the customary cultivator frame 20 of the tractor and is disposed considerably closer to the ground. Secured to the chassis of the tractor 10 on each side thereof in any suitable manner is a downwardly inclined support member or brace 30. In the arrangement shown, an angle iron 32 has one flange thereof secured to a leg of the angle iron brace 30 to securely mount each of the braces 30 to their respective sides of the tractor chassis. Journaled at the lower end of the braces 30 and extending therebetween is a cam shaft 34 upon which is mounted cam means 36. The cam shaft 34 and the cam means 36 are disposed directly above the cultivator assembly 28 and are the means whereby the cultivator assembly may be laterally moved out of engagement with the plants of the row. A drive means 38 from one of the rear driving wheels 14 of the tractor is utilized to actuate the cam shaft 34 to laterally move the cultivator assembly 28. To selectively interengage the drive means 38 with the cam shaft 34 an electrically operated clutch means or mechanism 40 is provided. This clutch mechanism 40 is mounted on one of the braces or support members 30. To operate the clutch means 40 so that the cam shaft 34 may be engaged with the drive means 38, an electrical circuit is provided which includes a front frame 42 suspended from the front axle 44 of the tractor, which frame 42 carries a plant actuated electrical contact switch 46, the engagement of which with a plant causes the electric clutch means 40 to operate and interengage the drive means 38 with the cam shaft 34 to thereby laterally move the cultivator assembly 28 out of the path of the plant. This is an over-all picture of the mounting of the attachment on the tractor and the specific details of the connection of the components of the attachment as well as their operational utility with one another will become presently apparent from the following detailed description of the components.

Cultivator assembly

Noting particularly Figures 2 and 3, it will be seen that the cultivator assembly 28 comprises generally a pair of L-shaped brackets 48 each having one leg thereof adjustably secured to a tool mounting bar 22 of the tractor. Of course, by loosening the spring clamps 24 of the lift unit 18, the brackets 48 may be selectively moved toward and away from one another on their respective stub shafts 22 and locked into selected adjusted positions. At the lower end of each depending leg of each bracket 48 is secured by means of a hinge connection a horizontally disposed tool bar 50 upon each of which is mounted hoes or cultivating feet 52. At the rear of rather adjacent the rear end of each tool bar 50 is welded or otherwise secured one hinge plate 54 of a hinge 56. The other plate 58 of the hinge 56 abuts one edge of the depending leg of each bracket 48 and is welded or otherwise suitably secured thereto. To rigidify the connection of the hinge plate 58 to the leg of each bracket 48, a gusset blade 60 is welded or otherwise suitably secured at one of its peripheral edges to bolt the hinge plate 56 and the leg of each bracket 48. By this arrangement, it will be clear that each of the tool bars 50 is capable of horizontal swinging movement toward and away from one another so that in their operative or row cultivating positions, the forward ends of each of the tool bars 50 will be disposed adjacent one another in an echelon formation whereas when they are in inoperative position they assume a position substantially parallel to one another straddling the plant row. As will be noted, these tool bars and the cultivating feet 52 are substantially similar to those already known and used in the art but are connected to the lift unit 18 of the tractor and to the brackets 48 in a novel manner whereby this unique horizontal swinging movement may be achieved to particularly adapt this cultivator assembly for plant row hoeing operations. Mounted on the outer side of each of the tool bars 50 forwardly of the attachment of these tool bars to the brackets 48 and substantially directly beneath the cam shaft 34 is a vertical standard 61. Upon that portion of the standard rising above each tool bar 50 is journaled a roller 63, the purpose of which will become apparent in the following description of the cam shaft 34 and the cam means 36.

Camming arrangement for laterally moving the cultivator assembly

Figure 4:
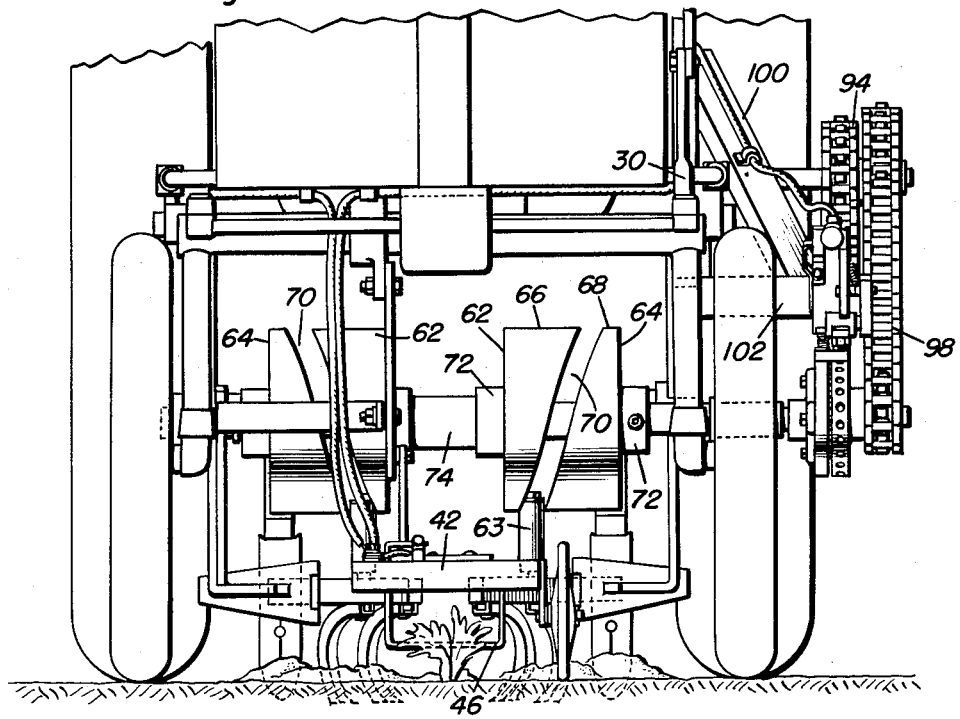
Figure 4 is an enlarged front elevational view of a portion of the tractor showing another view of the mounting of the attachment thereon.

The arrangement whereby the tool bars 50 of the cultivator assembly 28 may be horizontally swung about the hinges 56 is seen most readily in Figures 3 and 4. Noting first Figure 3, it will be noted that the cam shaft 34 extends between the braces 30 and is rotatably journaled in and supported by the lower ends of these braces 30. Between the braces 30 and disposed directly above the tool bars 50 of the cultivator assembly 28 are the cam means 36. Since the cam means 36 for each tool bar 50 is identical to the other cam means, a description of one will suffice for both. Each cam means 36 comprises a pair of disks 62 and 64 spaced apart from one another and having peripheral flanges 66 and 68 extending toward one another to provide a slot 70 therebetween. Hubs 72 and 74 fixedly mount the disks 62 and 64 respectively, against both rotational movement and sliding movement with respect to the cam shaft 34. The free ends or peripheral edges of the flanges 66 and 68 are angled with respect to the faces of the discs 62 and 64 whereby the slot 70 defined by these peripheral edges is in the form of a circle mounted at an angle on the cam shaft 34. Thus, one point or portion of the slot 70 is disposed closer to the face of disk 62 while the diametrically opposed portion of the slot is disposed closer to the face of disk 64. Referring most particularly to Figure 4, it will be noted that the complementary pairs of disks 62 and 64 above each tool bar 50 are so arranged that the slots 70 are oppositely angled with respect to one another. The standards 61 mounted on each of the tool bars 50 extend into a slot 70 formed between a pair of cam disks 62 and 64. The rollers 63 on the standards engage the peripheral edges of the flanges 66 and 68 respectively, whereby these peripheral edges form cam surfaces. Comparing for the moment, Figure 3 and Figure 4, it will be noted that in Figure 3 wherein the portions of the slots 70 below the cam shaft 34 are furthest away from one another, the tool bars 50 are swung to a substantially parallel relationship with one another whereby they are laterally moved out of engagement with the plant row while in Figure 4 wherein the portions of the slots 70 disposed below the cam shaft 34 are closest to one another, the tool bars 50 are swung so that their forward ends converge toward one another thereby placing the plow feet or cultivating feet 52 in line with the plant row. It is to be observed that the disks 62 and 64 of each cam means 36 are hollow and although this does somewhat lighten the weight of the disks, the primary purpose of this hollow arrangement is so that upon actuation of the lift mechanism 18 of the tractor, the tool bars 50 may be raised out of ground engagement with the standards being freely vertically slidable within the slots 70. Sleeve 76 on the shaft 34 between each set of disks 62 and 64 maintain the spacing between these sets of disks.

Drive means

The drive means for the cam shaft 34 is operated by movement of the tractor. Referring first to Figure 1, this drive means 38 will be seen to include a driving gear 78 mounted on one of the rear wheels 14 of the tractor. Mounted on the tractor chassis 12 between the rear wheel 14 and the cam shaft 34 is a stub shaft 80 which serves as a lay shaft upon which gears 90 and 92 are journaled. The gears 90 and 92 are keyed to one another for simultaneous rotation. Endless chain 94 is entrained over the drive gear 78 and intermediate or idler gear 90. Journaled on the cam shaft 34 is a driven gear 96 and endless chain 98 is entrained over the driven gear 96 and the intermediate or idler gear 92. With this arrangement, a convenient change speed chain drive is provided for the cam shaft 34, the speed ratio being regulated, of course, by the interchanging of endless chain 98 and endless chain 94 to the idler gears 90 and 92 respectively. Obviously, it is quite clear that this arrangement will operate in accordance with the movement of the tractor. To drivingly engage the driven gear 96 with the cam shaft 34, an electrically actuated clutch mechanism is provided indicated in the general description of the attachment by the numeral 40.

Clutch assembly

Referring now to Figures 3–8, the mounting and operation of the clutch mechanism 40 will be described. First, as shown in Figure 4, an auxiliary diagonally extending brace 100 is secured at its upper end to one of the inclined braces 30 and a horizontal member is secured to the lower end of the auxiliary brace member 100 as indicated at 102 and is secured at its other end to another portion of the inclined brace 30. This auxiliary brace assembly forms a bracket for the mounting of the clutch mechanism 40. Referring now most particularly to Figure 5, a solenoid 104 is secured to the auxiliary brace member 100 and has a plunger 106 extending therefrom. A vertical support 108 is secured to the cross brace 102 and is provided with a transverse bore 110 in its upper end. A plunger extension 112 is slidably disposed in the bore 110 and is secured in any suitable manner as by pin 114 to the free end of the plunger 106. The head 116 of the plunger extension 112 is disposed on the opposite side of the vertical support member 108 from the free end of the plunger 106. The head 116 of the plunger extension 112 is formed with a cylindrical enlargement 118 which joins the body of the plunger extension 112 by means of the tapered portion 120. A vertically disposed flat plate 122 is secured to the joining corner of the braces or bracket members 100, 102 and one surface of the vertical support member 108 abuts the inner face of this plate. A lever 124 is pivoted intermediate its ends by means of pivot pin 126 to the inner surface of the plate 122. The upper end of the lever 124 is notched as at 128 and seats between the head of the plunger extension 116 and the vertical support member 108. A coil spring 130 secured at one of its ends to the plate 122 and at its other end to the lever 124 above the pivot pin 126 continuously biases the upper end of the lever into engagement with the head 116 of the plunger extension 112. At the lower corner of the flat plate 122 adjacent the joining edge of the diagonal brace member 100 and cross member 102 is pivoted one end of an arm 132 which extends toward the lever 124. The free end of the arm 132 consists of an enlarged block 134 which is engaged by the lower end of the lever 124, which block 134 has a downwardly opening recess therein in which a roller or small wheel 136 is disposed. As will be noted, by this arrangement, the spring 130 constantly biases the lower end of the lever 124 into engagement with the block 134 on the arm 132; however, upon sharp jars the engaging action of the lower end of the lever 124 with the block 134 would be greatly decreased due to the inherent resiliency of the spring 130. Therefore, in order to most firmly maintain the lower end of the lever 124 in its engagement with the block 134, a locking bar 138 is pivoted to the support member 108 and is constructed in such a manner that a portion thereof will positively engage the upper portion of the lever 124 to prevent movement of the same. When the solenoid 104 is actuated, the plunger extension 112 will be pulled toward or rather the head 116 of the plunger will be pulled toward the support member 108 and the tapered surface 120 of the head 116 will bias or cam the bar 138 out of engagement with the upper end of the lever 124 while pulling the upper end of the lever 124 toward the support member 108 to release it from engagement with the block 134 on the arm 132. When the solenoid is de-energized, the spring finger 140 mounted on the vertical support member 108 will press the locking bar 138 back into engagement with the upper end of the lever 124 and again lock the same into firmly abutting relation with the block 134 as the compression spring 135 pushes the plunger 106 from the solenoid 104.

Formed integrally with the gear 96 is a disk 142 (note particularly Figure 3) having a plurality of circumferentially spaced sockets 144 in its periphery. Closely adjacent this disk 142 is a cam shaft driving disk 146 of identical diameter with the driven disk 142. However, the cam shaft driving disk 146 is fixedly mounted on the cam shaft 34 for rotation therewith by means of the hub 148. Antifriction bearings are disposed in circular bearing races formed between the disks 142 and 146.

Secured to the periphery of the driving disk 146 is a plate 152 conforming to the curvature of the disk. A portion of this plate 152 overlies the driven disk 142 as will be noted particularly in Figures 6 and 7. A pair of lugs or ears 154 are formed on this plate 152 and elongated lever 156 is pivotally carried intermediate its ends by these lugs 154. The forward end of the plate 152 is formed with an aperture 158 aligning with the sockets 144 on the driven disk 142. A pin 160 depending from the forward end of the lever 156 is disposed in this aperture 158. A lateral abutment 162 is formed on the clutch lever 156 behind the lugs 154 and a spring 164 has one end seating against this abutment and its other end seating on a boss formed on the driving disk 146 to constantly urge the clutch pin 160 into one of the sockets 144 on the driven disk 142. However, normally, the lower end of the lever 124 by its abutting engagement with the block 134 prevents this action by the spring 164 since the roller 136 positively engages the top surface of the clutch lever 156. Only when the solenoid 104 is actuated and the lever 124 released is the clutch pin 160 forced into a socket 144 by this action of the spring 164. Of course, when the pin is so forced, the cam shaft is then positively connected to the gear 96 and will be rotated in response to this gear. Thus, both the driving and driven disks 144 and 146 will rotate in unison for one revolution and should the solenoid be de-energized at the end of this revolution, the roller 136 will engage the top surface of the clutch lever 156 and urge the clutch pin 160 out of its socket 144 whereby the driving disk will again remain idle while the driven disk 142 continues to rotate. In this connection, reference might be had briefly to Figure 8 wherein the means are shown for limiting the downward movement of the arm 132 when the clutch is engaged and the block 134 is free from engagement with the clutch lever 156. A flat strip 168 is secured to the lower edge of the flat plate 122 and has a portion thereof extending in underlying relationship to the arm 132 whereby the downward movement of this arm is limited by virtue of the arm striking this plate 168.

Also, the abutment 162 on the clutch lever 156 is formed with an extension 170 within the spring 164 to prevent the spring from compressing to the extent of allowing the clutch lever 156 to slide under the block 134.

Further, the rear end of the clutch lever 156 is curved downwardly as at 172 so that when the movement of the tractor is reversed the clutch pin 160 will be disengaged to prevent breakage.

*Plant sensitive solenoid actuator*

Figure 10:
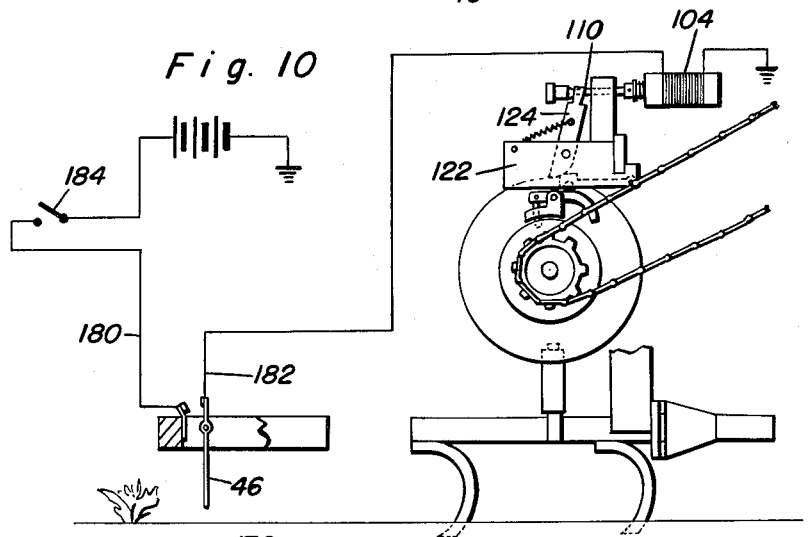
Figure 9:
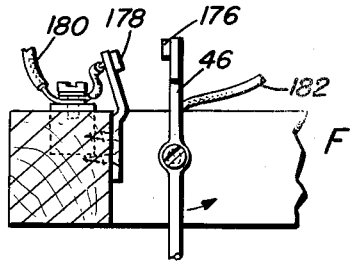
Figure 9 is an enlarged top view of the plant actuated contact switch of the cultivating device; and, Figure 10 is a diagram of the electrical circuit showing the flow of electricity from its source through the plant actuated contact switch to the electrically operated clutch.

To energize the solenoid 104, a plant contact circuit closing arrangement is provided as is shown most clearly in Figures 2, 9 and 10. To suspend the plant actuating switch carrying frame 42 from the front axle 44, a clamp is secured to this axle and a jointed leg 174 depends from this bracket and is secured to the U-shaped frame 42 at its lower end. The plate actuated contact switch 46 is swingably mounted between the legs of the U-shaped frame 42 and has an electrical contact 176 at its upper end. On the web of the U-shaped frame 42 is mounted a fixed contact 178. Conductor 180 leads from the fixed contact to an electric power source which may obviously be the battery of the tractor while a second conductor 182 leads from the movable contact of the swinging switch to the solenoid 104. When the lower end of the lever 46 comes in contact with a plant, the contact 176 is swung into engagement with the contact 178 and the solenoid 104 is energized whereby the clutch 40 is engaged and the cam disks rotated to swing the tool bars 50 out of the path of this plant. When the plant is passed, the contact 176 swings free of the contact 180 and the solenoid 104 is de-energized whereby the clutch mechanism 40 is disengaged and the tool bars 50 are again in their row cultivating position.

To support the switch mounting frame 42 above the ground, a wheel 188 is journaled in a bracket on one of the legs of the frame 42. Thus, the frame 42 will follow the contour of the land by virtue of its suspension from the jointed leg 174.

The upper portion of the leg is slotted 190 and a connecting arm 192 has one end slidingly and pivotally secured within the slot. The other end of the arm 192 is secured to the bracket 48 to lift the switch frame assembly upon raising of the cultivating assembly.

Observing Figure 10, wherein the electrical circuit is shown, it will be noted that the conductor 180 is also provided with a manually operated switch 184 in the event it is desired to utilize the same. Of course, when this switch is used, the conductor 182 is also secured to the fixed contact 178.

It is also to be noted that the mechanically actuated switch assembly could be replaced with an electric eye arrangement or other suitable circuit opening and closing devices without departing from the scope of the invention.

From the foregoing description, the construction and operation of the device will be readily apparent to those skilled in the art. However, since numerous modifications and changes will occur to those skilled in the art after a consideration of the foregoing specification taken in conjunction with the accompanying drawings, it is not desired to limit the invention to the exact construction shown and described. But, all suitable modifications may be resorted to that fall within the scope of the appended claims.

What is claimed as new is as follows:

1. For use with a tractor including a cultivator lift unit, a plant sensitive hoeing attachment for cultivating between plants in a row, said hoeing attachment including a cultivating assembly adapted to be suspended from the lift unit, said cultivating assembly comprising a pair of tool bars mounted for movement toward and away from one another, a support frame adapted to be secured to the tractor, a cam shaft journaled on said support frame, drive means for rotating said cam shaft, cam means on said cam shaft and means connecting said tool bars to said cam means for movement of the tool bars toward and away from each other in response to movement of the cam shaft, clutch means mounted on said support frame for selectively connecting said cam shaft to said drive means, and plant sensitive means for operating said clutch means disposed forwardly of said tool bars.

2. A row cultivating attachment for tractors consisting of a cultivating assembly adapted to be suspended beneath a tractor, cam means connected to said assembly for laterally moving the same, drive means for operating said cam means, an electrically operated clutch mechanism for engaging said cam means and said drive means, and electrical means for actuating said clutch mechanism, said cam means including a cam shaft, said driving means including a driven disc journaled on said cam shaft having peripheral sockets therein, said clutch means including a driving disc mounted on said cam shaft adjacent said driven disc, a block secured to the peripheral edge of said driving disc and overlying said driven disc, a clutch lever pivotally mounted on said block, a clutch pin carried by said clutch lever, resilient means urging said clutch pin into one of said sockets, and electrically operated means for preventing engagement of the clutch pin in a socket.

3. A row cultivating attachment for tractors consisting of a cultivating assembly adapted to be suspended beneath a tractor, cam means connected to said assembly for laterally moving the same, drive means for operating said cam means, an electrically operated clutch mechanism for engaging said cam means and said drive means, and electrical means for actuating said clutch mechanism, said cam means including a cam shaft, said driving means including a driven disc journaled on said cam shaft having peripheral sockets therein, said clutch means including a driving disc mounted on said cam shaft adjacent said driven disc, a block secured to the peripheral edge of said driving disc and overlying said driven disc, a clutch lever pivotally mounted on said block, a clutch pin carried by said clutch lever, resilient means urging said clutch pin into one of said sockets, and electrically operated means for preventing engagement of the clutch pin in a socket, said electrically operated means including an arm engaging said clutch lever and opposing the movement of the same, a solenoid, a lever disposed between and contacting said solenoid and said arm to normally hold said arm in engagement with said clutch lever, said electrical means including a plant actuated switch operating said solenoid to release said arm from said clutch lever.

4. A row cultivating attachment for tractors consisting of a cultivating assembly adapted to be suspended beneath a tractor, cams means connected to said assembly for laterally moving the same, drive means for operating said cam means, an electrically operated clutch mechanism for engaging said cam means and said drive means, and electrical means for actuating said clutch mechanism, said cam means comprising a cam shaft, spaced pairs of discs mounted on said cam shaft, the discs of each pair having peripheral flanges extending toward one another, the edges of said flanges being inclined with respect to the disc faces to form an eccentric slot between the discs, said driving means including a driven disc journaled on said cam shaft having peripheral sockets therein, said clutch means including a driving disc mounted on said cam shaft adjacent said driven disc, a block secured to the peripheral edge of said driving disc and overlying said driven disc, a clutch lever pivotally mounted on said block, a clutch pin carried by said clutch lever, resilient means urging said clutch pin into one of said sockets, and electrically operated means for preventing engagement of the clutch pin in a socket.

5. A row cultivating attachment for tractors consisting of a cultivating assembly adapted to be suspended beneath a tractor, cam means connected to said assembly for laterally moving the same, drive means for operating said cam means, an electrically operated clutch mechanism for engaging said cam means and said drive means, and electrical means for actuating said clutch mechanism, said cam means including a cam shaft, said driving means including a driven disc journaled on said cam shaft having peripheral sockets therein, said clutch means including a driving disc mounted on said cam shaft adjacent said driven disc, a block secured to the peripheral edge of said driving disc and overlying said driven disc, a clutch lever pivotally mounted on said block, a clutch pin carried by said clutch lever, resilient means urging said clutch pin into one of said sockets, and electrically operated means for preventing engagement of the clutch pin in a socket, said cultivating assembly including a pair of spaced, horizontally disposed tool bars, cultivating feet on said tool bars, mounting means for attaching said tool bars to the tractor, hinge means securing said tool bars to said mounting means for horizontal swinging movement and means connecting said tool bars to said cam means.

6. A row cultivating attachment for tractors consisting of a cultivating assembly adapted to be suspended beneath a tractor, cam means connected to said assembly for laterally moving the same, drive means for operating said cam means, an electrically operated clutch mechanism for engaging said cam means and said drive means, and electrical means for actuating said clutch mechanism, said cultivating assembly including a pair of spaced, horizontally disposed tool bars, cultivating feet on said tool bars, mounting means for attaching said tool bars to the tractor, hinge means securing said tool bars to said mounting means for horizontal swinging movement and means connecting said tool bars to said cam means, said cam means comprising a cam shaft, spaced pairs of discs mounted on said cam shaft, the discs of each pair having peripheral flanges extending toward one another, the edges of said flanges being inclined with respect to the disc faces to form an eccentric slot between the discs, said driving means including a driven disc journaled on said cam shaft having peripheral sockets therein, said clutch means including a driving disc mounted on said cam shaft adjacent said driven disc, a block secured to the peripheral edge of said driving disc and overlying said driven disc, a clutch lever pivotally mounted on said block, a clutch pin carried by said clutch lever, resilient means urging said clutch pin into one of said sockets, and electrically operated means for preventing engagement of the clutch pin in a socket.

7. The combination of claim 6 wherein said connecting means comprises vertical standards on said tool bars received in said eccentric slots.

8. A clutch mechanism comprising a driving disk and a driven disk having peripheral sockets therein mounted on a shaft in side-by-side relation, a block secured to the peripheral edge of said driving disk and overlying said driven disk, a clutch lever pivotally mounted on said block, a clutch pin carried by said clutch lever, resilient means urging said clutch pin into one of said sockets, and releasable means holding said pin out of said sockets, said releasable means engaging said clutch lever and biasing the clutch pin out of a socket on the driven disk upon completion of one revolution of said disks.

9. A plant row cultivator comprising a cultivating assembly adapted to move along a row of plants, a plant detector disposed in advance of said assembly for detecting a plant in the path of the assembly, and means connected to said assembly and operated by the detector for shifting the assembly horizontally to one side of the plant and then returning the assembly to the plant row after the detected plant is passed, said assembly including a supporting structure, tool carrying means horizontally swingably carried by said structure and including two tool bars adapted to straddle the plants in a row of plants, cultivators carried by said tool carrying bars, said connected means including a cam shaft journaled on said structure at an angle to said tool carrying means, cam means on said cam shaft and including a pair of converging surfaces, means interconnecting said cam means and tool carrying means for horizontally swinging said tool carrying bars toward and away from each other upon actuation of said cam shaft to thereby remove some plants in the row between said tool bars.

10. A plant row cultivator comprising a cultivating assembly adapted to move along a row of plants, a plant detector disposed in advance of said assembly for detecting the presence of a plant in the path of movement of said assembly, said assembly including a pair of tool bars adapted to straddle the plants of the row, means mounting said bars for movement toward and away from each other in order to destroy the plants between said bars when said bars are drawn together, said detector including a switch, means to operate said switch by contact with plants in the row of plants, a clutch, electrical means including said switch for actuating said clutch, and means drivingly connected to said clutch for displacing said bars toward and away from each other.

11. The plant row cultivator of claim 10 wherein said tool bar actuating means include a cam shaft whose actuation is controlled by said clutch, said shaft being provided with two cam surfaces, cam followers operatively connected with said cam surfaces, and means connecting said cam followers to said bars in order to individually actuate said bars.

12. A plant row cultivator comprising a cultivating assembly adapted to move along a row of plants, a plant detector disposed in advance of said assembly for detecting the presence of a plant in the path of movement of said assembly, said assembly including a pair of tool bars adapted to straddle the plants of the row, means mounting said bars for movement toward and away from each other in order to destroy the plants between said bars when said bars are drawn together, said detector including a switch, means to operate said switch by contact with plants in the row of plants, a clutch, electrical means including said switch for actuating said clutch, means drivingly connected to said clutch for displacing said bars toward and away from each other, a frame on which said switch operator is mounted, and a ground contacting supporting means for the frame secured thereto so that said frame and said switch operator follow the contour of the land as the cultivator is moved forward.

13. In a cultivator attachment, a cultivating assembly including a structural support, a pair of tool supporting bars secured to said support for movement toward and away from each other, a frame, ground contacting means carried by said frame in order to support said frame, a switch operator carried by said fame for movement therewith independent of said structural support, means operatively connected with said bars for moving said bars toward and away from each other and including a control circuit having a switch therein, and said switch operator being operatively connected with said switch.

References Cited in the file of this patent

UNITED STATES PATENTS

| | | |
|---|---|---|
| 378,286 | Carley | Feb. 21, 1888 |
| 504,756 | Schofield | Sept. 12, 1893 |
| 886,179 | Bragunier | Apr. 28, 1908 |
| 912,087 | Demsey | Feb. 9, 1909 |
| 1,230,079 | Burns | June 12, 1917 |
| 1,331,148 | Givin | Feb. 17, 1920 |
| 1,570,415 | Sumbulian | Jan. 19, 1926 |
| 2,489,633 | Fulgham | Nov. 29, 1949 |
| 2,502,468 | Marihart | Apr. 4, 1950 |
| 2,551,120 | Harrison | May 1, 1951 |
| 2,669,170 | Sauder | Feb. 16, 1954 |
| 2,706,437 | Sanders | Apr. 19, 1955 |